S. Ingersoll,
Drag Saw.

Nº 15,913.   Patented Oct. 14, 1856.

UNITED STATES PATENT OFFICE.

SIMON INGERSOLL, OF GREENPOINT, NEW YORK, ASSIGNOR TO FARMERS & MECHANICS MANUFG. CO., OF SAME PLACE.

METHOD OF FELLING TREES.

Specification of Letters Patent No. 15,913, dated October 14, 1856.

*To all whom it may concern:*

Be it known that I, SIMON INGERSOLL, of Greenpoint, in the county of Kings and State of New York, have invented a new and Improved Machine for Sawing Down Standing Trees; and I do hereby declare that the following is a full, clear, and exact description of the same, reference being had to the annexed drawings, making a part of this specification, in which—

Figure 1:
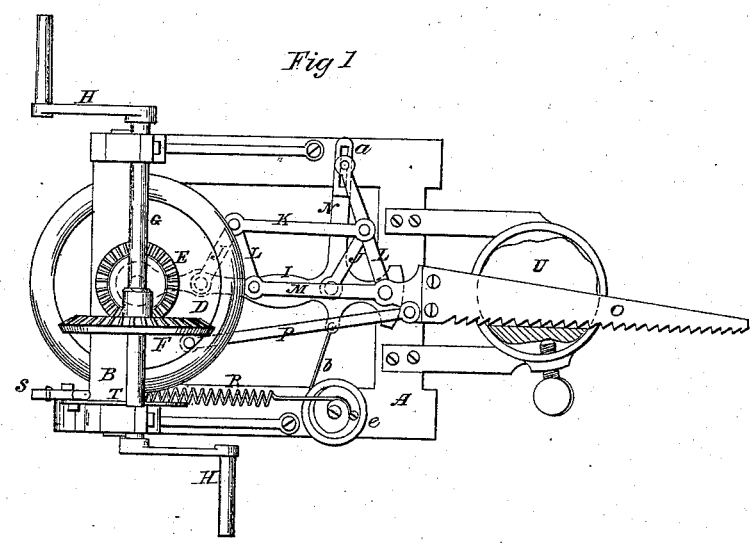
Figure 2:
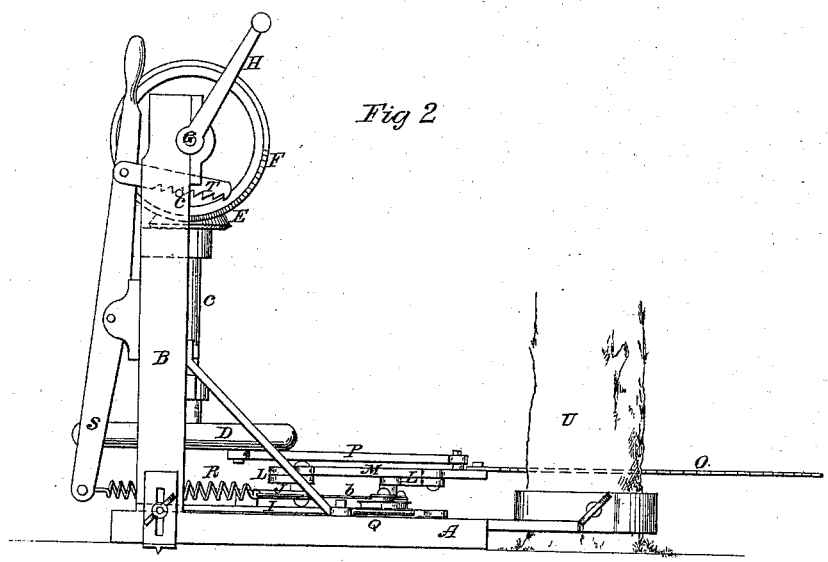

Figure 1, is a plan or top view of my improvement. Fig. 2, is a side view of ditto.

Similar letters of reference indicate corresponding parts in the two figures.

My invention consists in attaching the saw to parallel levers which are secured to a pivoted bar to which a spring is connected to feed the saw to its work. The saw is driven by a crank pulley and pitman and the several parts are so arranged that standing trees may be sawed down with the greatest facility and in an expeditious manner.

To enable those skilled in the art to fully understand and construct my invention, I will proceed to describe it.

A, represents a rectangular frame having an upright frame B, at one end.

C, represents a vertical shaft which is placed within the frame B, and has a crank pulley D, at its lower end and a bevel pinion E, on its upper end. The bevel pinion E, gears into a wheel F, which is placed on a horizontal shaft G, in the upper part of the frame B. This shaft has a crank H, at each end.

I, represents a bar, one end of which is pivoted to one of the end pieces of the frame A, underneath the upright frame B. This bar has two levers J, J, pivoted to it, the outer ends of said levers being pivoted to a bar K, which also has two levers L, L, pivoted to it, the levers L, being also pivoted to a bar M. The two levers J, J, in consequence of being connected to the bar K, work parallel with each other, and the same may be said in regard to the levers L, L. One of the levers L, extends beyond the arm M, and has a pin inserted in its end which pin works in a slot (*a*), in an arm or guide N, attached to the bar I, see fig. 1.

O, represents the saw, which is attached to the end of the bar M; the saw is attached flatwise to the bar M, and a pitman P, is also attached to the outer end of the bar M, said pitman being connected to the crank pulley D.

Q, is a pulley which is attached to the upper surface of the frame A, and (*b*), is a cord or chain which passes around said pulley, one end of said cord or chain being attached to the outer end of the bar I, and the opposite end attached to one end of a spring R. The opposite end of this spring is attached to the lower end of a lever S, which is pivoted to one of the uprights of the frame B. The upper end of the lever S, has a rack T, attached to it, which catches on a pin (*c*), driven in the inner side of one of the uprights of the frame B.

The operation is as follows: The outer end of the frame, A, is placed against the tree U, to be sawed down, the end of the frame being attached to a hook driven in the tree. The back end of the frame A, is so adjusted that the frame may be in a horizontal position. Motion is then given the shaft G, in any proper manner, either by hand or otherwise, and the crank pulley D, and pitman P, give a reciprocating motion to the saw which is fed to its work by the spring R, the saw cutting as it is drawn backward. The feed is regulated by adjusting the lever S, so as to increase or diminish the strength of the spring.

The above invention has been practically tested and it operates in a perfect manner.

The device is simple, not expensive to construct, and is not liable to get out of repair.

Having thus described my invention, what I claim as new, and desire to secure by Letters Patent, is,

Attaching the saw O, to the bar M, which is connected with the levers J, J, L, L, and bars K, I, as shown, the bar I, being connected with the spring R; the whole being arranged as described, for the purpose set forth.

SIMON INGERSOLL.

Witnesses:
I. W. COOMBS,
I. F. BUCKLEY.